US012624198B2

(12) United States Patent
Xu et al.

(10) Patent No.: US 12,624,198 B2
(45) Date of Patent: May 12, 2026

(54) RUBBER COMPOSITION, PROCESSING METHOD THEREOF, AND RUBBER PRODUCT USING THE SAME

(71) Applicant: HANGZHOU XINGLU TECHNOLOGIES CO., LTD, Hangzhou (CN)

(72) Inventors: Tao Xu, Hangzhou (CN); Zhi Sheng Fu, Hangzhou (CN); An Yang Wu, Hangzhou (CN)

(73) Assignee: HANGZHOU XINGLU TECHNOLOGIES CO., LTD, Zhejiang (CN)

( * ) Notice: Subject to any disclaimer, the term of this patent is extended or adjusted under 35 U.S.C. 154(b) by 161 days.

(21) Appl. No.: 16/477,654

(22) PCT Filed: Jan. 12, 2018

(86) PCT No.: PCT/CN2018/072367
§ 371 (c)(1),
(2) Date: Jul. 12, 2019

(87) PCT Pub. No.: WO2018/130195
PCT Pub. Date: Jul. 19, 2018

(65) Prior Publication Data
US 2019/0359805 A1     Nov. 28, 2019

(30) Foreign Application Priority Data

Jan. 13, 2017     (CN) ......................... 201710025137.6
Jan. 10, 2018     (CN) ......................... 201810020839.X

(51) Int. Cl.
| | |
|---|---|
| *C08L 23/06* | (2006.01) |
| *B60C 1/00* | (2006.01) |
| *B65G 15/34* | (2006.01) |
| *C08F 10/02* | (2006.01) |
| *C08K 3/36* | (2006.01) |
| *C08L 23/16* | (2006.01) |
| *B29B 9/06* | (2006.01) |
| *B29C 43/24* | (2006.01) |
| *B29K 23/00* | (2006.01) |
| *B29K 105/00* | (2006.01) |
| *B29K 509/08* | (2006.01) |

(52) U.S. Cl.
CPC ............ *C08L 23/06* (2013.01); *B60C 1/0016* (2013.01); *B60C 1/0025* (2013.01); *B65G 15/34* (2013.01); *C08F 10/02* (2013.01); *C08K 3/36* (2013.01); *C08L 23/16* (2013.01); *B29B 9/06* (2013.01); *B29C 43/24* (2013.01); *B29K 2023/16* (2013.01); *B29K 2105/0094* (2013.01); *B29K 2509/08* (2013.01); *B29K 2995/0088* (2013.01); *C08F 2810/20* (2013.01); *C08L 2203/202* (2013.01); *C08L 2205/025* (2013.01); *C08L 2205/03* (2013.01);

*C08L 2205/035* (2013.01); *C08L 2207/07* (2013.01); *C08L 2312/00* (2013.01)

(58) Field of Classification Search
CPC .... C08L 23/06; C08L 23/16; C08L 2203/202; C08L 2205/025; C08L 2205/035; C08L 2207/07; C08L 2312/00; C08L 91/00; C08L 71/02; C08K 3/36; C08K 3/346; C08K 3/22; C08K 5/14; C08F 10/02; C08F 2810/20; C08F 110/02; C08F 4/7006; C08F 2500/09; C08F 2500/04; C08F 2500/17; B29K 2023/16; B29K 2105/0094; B29K 2509/08; B29K 2995/0088; B60C 1/0016; B60C 1/0025; B65G 15/34
See application file for complete search history.

(56) References Cited

U.S. PATENT DOCUMENTS

| | | | | | |
|---|---|---|---|---|---|
| 3,758,643 | A | * | 9/1973 | Fischer | C08K 5/14 |
| | | | | | 525/51 |
| 5,866,663 | A | * | 2/1999 | Brookhart | C08F 210/14 |
| | | | | | 526/348 |
| 5,869,563 | A | * | 2/1999 | Kawasaki | C08L 23/16 |
| | | | | | 524/525 |

(Continued)

FOREIGN PATENT DOCUMENTS

| | | | | | |
|---|---|---|---|---|---|
| CN | 104877225 | A | * | 9/2015 | C08L 23/06 |
| EP | 2865540 | A1 | * | 4/2015 | B60C 1/00 |

OTHER PUBLICATIONS

EPO machine translation of CN 104877225 A, to Fan et al. published Sep. 2, 2015 (Year: 2015).*

*Primary Examiner* — Jane L Stanley
(74) *Attorney, Agent, or Firm* — Ingrassia Fisher & Lorenz, LLP

(57)     ABSTRACT

The present invention discloses a rubber composition, a processing method thereof, and rubber product reinforced with silica using the same. The rubber composition comprises a rubber matrix and essential components, wherein, based on 100 parts by weight of the rubber matrix, the rubber matrix comprises, a branched polyethylene with a content represented as A, in which $0<A\leq100$, and an EPM and an EPDM with a total content represented as B, in which $0\leq B<100$; and the essential components comprise 1-10 parts of a crosslinking agent and 15-80 parts of silica. The rubber composition can be used for producing high-voltage insulating sheath rubber, high-temperature resistant conveyor belt, waterproof coil, rubber particles for plastic track surface layer, rubber plug, rubber roller, inner tube, tire tread, tire sidewall, and inner rubber layer of air-conditioner hose.

19 Claims, No Drawings

(56)                    References Cited

U.S. PATENT DOCUMENTS

| | | | |
|---|---|---|---|
| 6,455,616 B1 * | 9/2002 | Cogen ................... | H01B 3/441 |
| | | | 524/461 |
| 7,338,999 B2 * | 3/2008 | Yagi ..................... | B60C 1/0016 |
| | | | 524/493 |
| 2016/0108214 A1 * | 4/2016 | Tokimune .............. | C08L 21/00 |
| | | | 524/418 |
| 2016/0237259 A1 * | 8/2016 | Hardy ................... | C08L 15/00 |

* cited by examiner

RUBBER COMPOSITION, PROCESSING METHOD THEREOF, AND RUBBER PRODUCT USING THE SAME

CROSS REFERENCE TO RELATED APPLICATIONS

The present application is the U.S. national phase of and claims priority to International Patent Application No. PCT/CN2018/072367 filed Jan. 12, 2018, which claims the benefit of priority from China National Application No. 201710025137.6, filed on Jan. 13, 2017 and China National Application No. 201810020839.X, filed on Jan. 10, 2018, the entire content of each of which is incorporated herein by reference into the present disclosure as if fully set forth herein.

TECHNICAL FIELD

The present invention belongs to the technical field of rubbers, and in particular relates to a rubber composition reinforced by silica and a processing method thereof, and a rubber product using the rubber composition.

BACKGROUND

Silica is the most commonly used light-color filler with good reinforcement.

Ethylene-propylene rubber reinforced with silica often has the characteristics of good tear resistance, high adhesion strength, wet skid resistance, abrasion resistance and less heat generation, can be used to produce various rubber products such as waterproof coils, conveyor belts, plastic tracks, washing machine door seals, rubber rollers, rubber plugs, inner tubes, tire treads, tire sidewalls, and air-conditioner rubber hoses, but is weaker than ethylene-propylene rubber products reinforced by carbon black in terms of resilience, compression set resistance, and the like. Sulfur vulcanization and peroxide vulcanization are the two most commonly used vulcanization systems for ethylene-propylene rubber. Peroxide vulcanization can make vulcanized rubber have better heat resistance, aging resistance, resilience and compression set resistance, but it is weaker than sulfur vulcanized rubber in mechanical strength. Therefore, how to obtain better aging resistance, resilience, mechanical properties and compression set resistance of rubber products reinforced by silica in a peroxide-based vulcanization system is a problem to be solved.

Ethylene-propylene rubbers are a kind of synthetic rubbers with a saturated molecular backbone, and include ethylene-propylene monomer (EPM) and ethylene-propylene-diene monomer (EPDM), both of which have good aging resistance. EPDM is commonly used in the ethylene-propylene rubber products. However, since the EPDM contains a third monomer with a molecular chain having a double bond and the EPM has a completely saturated molecular chain, the EPM has more excellent aging resistance. Therefore, in a situation where a higher requirement is raised for the aging resistance, it is a common technical solution to use the EPM in combination to improve the aging resistance of the EPDM. However, the mechanical strength of the EPM is low, which affects the overall physical and mechanical properties.

The EPM is a copolymer of ethylene and propylene, which is a copolymer of ethylene and an $\alpha$-olefin. The copolymer of ethylene and an $\alpha$-olefin is a polymer containing only carbon and hydrogen elements and having a saturated molecular chain. The common types of carbon atoms found in such polymers generally include primary, secondary and tertiary carbons, in which the tertiary carbon is most susceptible to hydrogen abstraction to form a free radical. Accordingly, the proportion of tertiary carbon atoms in all carbon atoms is generally considered to be a major factor affecting the aging resistance of ethylene/$\alpha$-olefin copolymers. The lower the proportion is, the better the aging resistance will be. The proportion can be expressed by the degree of branching. For example, EPM having a propylene content of 60% by weight can be calculated to contain 200 propylene units, that is, 200 tertiary carbon atoms or 200 methyl branches, per 1000 carbon atoms, so the degree of branching is 200 branches/1000 carbon atoms. The EPM usually has an ethylene content of 40-65% or 40-60% by weight, so the degree of branching is generally in the range of 117-200 branches/1000 carbon atoms or 133-200 branches/1000 carbon atoms. This degree of branching is considered to be higher than that of other common ethylene/$\alpha$-olefin copolymers.

In the prior art, the $\alpha$-olefin in the common ethylene/$\alpha$-olefin copolymers may include, in addition to propylene, an $\alpha$-olefin having a carbon atom number of not less than 4, which may be selected from a $C_4$-$C_{20}$ $\alpha$-olefin, and is generally selected from 1-butene, 1-hexene and 1-octene. If the degree of branching of an ethylene/$\alpha$-olefin copolymer is too low, the melting point and crystallinity are too high, so it is not suitable for use as a rubber component. If the degree of branching is too high, the content of $\alpha$-olefin is high, which leads to a higher process difficulty and raw material cost, and a lower operability and economical efficiency. In the prior art, a polyolefin obtained by copolymerizing ethylene with 1-butene or ethylene with 1-octene can be referred to as a polyolefin plastomer or a polyolefin elastomer according to the magnitudes of crystallinity and melting points. Due to their proper crystallinity and melting points, some polyolefin elastomer brands can be well used in combination with an ethylene-propylene rubber and have a low degree of branching, so they are considered to be an ideal material for improving the aging resistance of ethylene-propylene rubbers, and can be used in place of ethylene-propylene rubbers to some extent. Since an ethylene/1-octene copolymer has more flexible molecular chain, higher rubber elasticity, and better mechanical performance than an ethylene/1-butene copolymer, the polyolefin elastomer commonly used in rubber products is generally a copolymer of ethylene and 1-octene at present, in which the octene content in percentage by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of EPM. Therefore, the ethylene/1-octene copolymer has excellent aging resistance and good physical and mechanical properties.

Rubbers are usually used after crosslinking. Among common crosslinking methods for ethylene-propylene rubbers, peroxide crosslinking or irradiation crosslinking can be suitably used for a copolymer of ethylene and an $\alpha$-olefin, both of which mainly comprise: forming a tertiary carbon radical by hydrogen abstraction from a tertiary carbon and then creating a carbon-carbon crosslink by free radical bonding. However, an ethylene/1-octene copolymer (hereinafter referred to as POE) has a low number of tertiary carbon atoms and has a longer branch attached to the tertiary carbon atom, so the steric hindrance is large, and free radical reaction is difficult to occur, resulting in difficulty in crosslinking, and affecting the processing efficiency and product performance. For example, the compression set resistance is unsatisfactory.

Therefore, there is currently a need for a better technical solution, which can improve the aging resistance of ethylene-propylene rubbers while the rubber composition has good physical and mechanical properties and crosslinking performances, and is expected to behave well with respect to particular functional performances of rubber products (for example, compression set resistance and so on).

SUMMARY

In view of the problems existing in the prior art, the present invention provides a rubber composition and a processing method thereof. Branched polyethylene with a degree of branching of not less than 50 branches/1000 carbon atoms is used to replace a part or all of the ethylene-propylene rubber, and can be applied to rubber products mainly reinforced by silica to obtain good heat resistance, compression set resistance and mechanical strength under a peroxide vulcanization system, and the defects of the prior art can be improved.

In order to achieve the objectives, the technical solution adopted in the present invention provides a rubber composition comprising a rubber matrix and essential components. The rubber matrix comprises a branched polyethylene with a content represented as A, in which 0<A≤100, and an EPM and an EPDM with a total content represented as B, in which 0≤B<100; based on 100 parts by weight of the rubber matrix, the essential components comprise 1-10 parts of a crosslinking agent and 15-80 parts of silica, wherein the branched polyethylene has a degree of branching of not less than 50 branches/1000 carbon atoms, a weight average molecular weight of not less than 50,000, and a Mooney viscosity ML (1+4) at 125° C. of not less than 2.

In the prior art, "branched polyethylene" refers to, in addition to an ethylene homopolymer having branches, a saturated vinyl copolymer having branches, for example, an ethylene-α-olefin copolymer, which may be POE. Although POE performs well in physical and mechanical properties and aging resistance, the crosslinking performances are less good. Therefore, although the branched polyethylene of the present invention can include both a branched ethylene homopolymer and POE, it is preferred that the branched polyethylene comprises a high proportion of or exclusively a branched ethylene homopolymer. In a preferred technical solution of the present invention, the branched polyethylene comprises exclusively a branched ethylene homopolymer.

In the further elaboration of the technical solution of the present invention, the branched polyethylene used is a branched ethylene homopolymer unless otherwise particularly specified.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method comprises mainly homopolymerizing ethylene following a "chain walking mechanism" in the presence of a late transition metal catalyst, where the late transition metal catalyst is preferably an (α-diimine)nickel/palladium catalyst. The nature of the chain walking mechanism refers to the fact that a β-hydrogen elimination reaction and a re-insertion reaction tend to occur in the polymerization of an olefin in the presence of a late transition metal catalyst, for example, an (α-diimine)nickel/palladium catalyst, thereby causing branching. The branches pendant to the backbone of such branched polyethylene may have different numbers of carbon atoms, and specifically 1-6 or more carbon atoms.

The production cost of an (α-diimine) nickel catalyst is significantly lower than that of an (α-diimine) palladium catalyst, and the (α-diimine) nickel catalyst has a high rate and high activity in catalyzing the polymerization of ethylene, and is thus more suitable for industrial application. Therefore, in the present invention, an (α-diimine) nickel catalyst is preferably used in the production of branched polyethylene through catalytic polymerization of ethylene.

The degree of branching of the branched polyethylene used in the present invention is preferably 50-130 branches/1000 carbon atoms, further preferably 60-130 branches/1000 carbon atoms, and further preferably 60-116 branches/1000 carbon atoms. The degree of branching is between that of a POE and EPM, constituting a new technical solution that is different from the prior art. Therefore, the rubber matrix of the present invention has both excellent aging resistance and good crosslinking performances.

The crosslinking performances include factors such as crosslinking density and crosslinking rate, and are the specific manifestations of the crosslinking ability of the rubber matrix in the processing process.

The branched polyethylene used in the present invention preferably has a methyl branch content of 40% or more or 50% or more, and has a similarity in structure with the EPM. In terms of the crosslinking ability, the degree of branching (the content of tertiary carbon atom) and the steric hindrance around the tertiary carbon atom are the two main factors affecting the crosslinking ability of a saturated polyolefin. Compared with the EPM, the branched polyethylene used in the present invention has a low degree of branching, and since the branched polyethylene has branches with the carbon number of not less than 2, the steric hindrance around the tertiary carbon atom of the branched polyethylene used in the present invention is theoretically greater than that of the EPM. Taking the two factors into account, it can be inferred that the crosslinking ability of the branched polyethylene used in the present invention is weaker than that of the EPM and further weaker than that of the EPDM. However, the actual crosslinking ability of the partially branched polyethylene used in the present invention is close to, and can even be equal to or better than that of the EPDM. This means that the rubber composition of the present invention can achieve a good aging resistance while the crosslinking ability is not weakened, and can even have excellent crosslinking performances to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a crosslinking reaction is more likely to occur. Having a secondary branch structure is a significant distinction of the branched polyethylene used in the preferred technical solution of the present invention from the EPM or the conventional ethylene-α-olefin copolymer in the prior art.

It is a new technical solution to improve the crosslinking ability of a saturated polyolefin elastomer by using the secondary branch structure with lower steric hindrance. According to the technical solution of the present invention, it is also considered to be within the technical protection of the present invention to include a vinyl copolymer having a secondary branch structure or other saturated hydrocarbon polymers in the rubber matrix. The vinyl copolymer refers to a copolymer of ethylene with a branched α-olefin and has a secondary branch structure. The branched α-olefin may be selected from the group consisting of isobutene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, and 6-methyl-1-heptene, and the comonomer may also include a common linear α-olefin.

It is generally believed in the prior art that the branched polyethylene produced in the presence of an (α-diimine) nickel catalyst is difficult to have a secondary branch structure that is at least difficult to fully identify, and the technical solution of the present invention also provides a new idea for analyzing the structure of the branched polyethylene.

Compared with the ethylene-propylene rubber, when branched polyethylene has an appropriate number of secondary branch structures, the crosslinking point of the branched polyethylene can be generated on the tertiary carbon of the backbone or on the branched tertiary carbon of the secondary structure during the peroxide crosslinking. Therefore, the rubber network formed by the peroxide crosslinking of the branched polyethylene has richer C-C bonding segments between the backbones than the ethylene-propylene rubber, which can effectively avoid the concentration of stress, and contribute to better mechanical properties. On the other hand, better crosslinking ability can effectively increase the crosslinking density, and the molecular weight distribution of the branched polyethylene is close to 2, which is narrower than that of the general ethylene-propylene rubber, so that it is also expected to obtain better compression set resistance.

In a further technical solution, the rubber matrix comprises, based on 100 parts by weight, a branched polyethylene with a content represented as A, in which 10≤A≤100; and an EPM and an EPDM with a total content represented as B, in which 0≤B≤90, where the branched polyethylene is an ethylene homopolymer having a degree of branching of 60-130 branches/1000 carbon atoms, a weight average molecular weight of 66,000-518,000, and a Mooney viscosity ML (1+4) at 125° C. of 6-102.

In a further technical solution, the rubber matrix comprises, based on 100 parts by weight, a branched polyethylene with a content represented as A, in which 10≤A≤100; and an EPM and an EPDM with a total content represented as B, in which 0≤B≤90, where the branched polyethylene is an ethylene homopolymer having a degree of branching of 70-116 branches/1000 carbon atoms, a weight average molecular weight of 201,000-436,000, and a Mooney viscosity ML (1+4) at 125° C. of 23-101.

In a further technical solution, the rubber matrix comprises, based on 100 parts by weight, a branched polyethylene with a content represented as A, in which 10≤A≤100; and an EPM and an EPDM with a total content represented as B, in which 0≤B≤90, where the branched polyethylene is an ethylene homopolymer having a degree of branching of 80-105 branches/1000 carbon atoms, a weight average molecular weight of 250,000-400,600, and a Mooney viscosity ML (1+4) at 125° C. of 40-95.

In a further technical solution, the rubber matrix comprises, based on 100 parts by weight, a branched polyethylene with a content represented as A, in which 10≤A≤100; and an EPM and an EPDM with a total content represented as B, in which 0≤B≤90, where the branched polyethylene is an ethylene homopolymer having a degree of branching of 80-105 branches/1000 carbon atoms, a weight average molecular weight of 268,000-356,000, and a Mooney viscosity ML (1+4) at 125° C. of 42-80.

In a further technical solution, a third monomer of the EPDM is preferably a diene monomer, and is particularly selected from the group consisting of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylidene-2-norbornene, 1,5-cyclooctadiene, 1,4-cyclooctadiene, and the like. In particular, the ethylene-propylene rubber may contain two or more diene monomers, for example, 5-ethylidene-2-norbornene and 5-vinyl-2-norbornene. The functional group of the diene monomer can function as an intrinsic assistant crosslinking agent in the peroxide vulcanization to improve the crosslinking efficiency. This reduces the amount and residue of the crosslinking agent and the assistant crosslinking agent required and the cost when they are added. The content in percentages by weight of the diene monomer relative to the ethylene-propylene rubber is preferably from 1%-14%, more preferably from 3%-10%, and further preferably from 4%-7%.

In a further technical solution, the crosslinking agent includes at least one of a peroxide crosslinking agent and sulfur. The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

In a further technical solution, the essential components include 2-7 parts of a crosslinking agent and 30-60 parts of silica based on 100 parts by weight of the rubber matrix.

In a further technical solution, the silica is at least one of precipitated silica and fumed silica, and the precipitated silica is high-dispersibility precipitated silica. For a rubber product which is required for transparency, transparent silica may be used, and the particle diameter is preferably 10-50 nm, and more preferably 15-30 nm.

In a further technical solution, the rubber composition also comprises auxiliary components, and based on 100 parts by weight of the rubber matrix, the auxiliary components include: 0.2-10 parts of an assistant crosslinking agent, 20-120 parts of an inorganic filler, 2-130 parts of a plasticizer, 1-3 parts of a stabilizer, 2-20 parts of metal oxide, 1-20 parts of a surface modifier, 1-10 parts of a coloring agent, 0-3 parts of a vulcanization accelerator, and 0-20 parts of a binder.

In a further technical solution, the stabilizer includes at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

In a further technical solution, the assistant crosslinking agent comprises at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene dimethacrylate, N,N'-m-phenylene bismaleimide, N,N'-bis(furfurylidene)acetone, 1,2-polybutadiene, a metal salt of an unsaturated carboxylic acid, and sulfur. The metal salt of an unsaturated carboxylic acid includes at least one of zinc acrylate, zinc methacrylate, and magnesium methacrylate.

In a further technical solution, the plasticizer comprises at least one of pine tar, motor oil, naphthenic oil, paraffin oil, coumarone, RX-80, stearic acid, and paraffin. Stearic acid can also act as an active agent in a sulfur vulcanization-based system, and reacts with some metal oxides to form soluble salts, thereby increasing the activation of an accelerator by metal oxides. Proper use of a plasticizer can increase the elasticity of the rubber compound and the plasticity suitable for process operation. In order to increase the adhesion, it is also preferred to use a tackifier such as pine tar, coumarone, RX-80, liquid polyisobutene and the like.

In a further technical solution, the metal oxide includes at least one of zinc oxide, magnesium oxide, and calcium oxide.

In a further technical solution, the inorganic filler includes at least one of calcium carbonate, talcum powder, calcined clay, magnesium silicate, magnesium carbonate, and barium sulfate.

In a further technical solution, the surface modifier includes at least one of polyethylene glycol having a molecular weight of 2000 or 3400 or 4000, diphenyl silicon glycol, triethanolamine, vinyl tris(2-methoxyethoxy)silane (A-172), 3-glycidoxypropyltrimethoxysilane (A-187), and γ-mercaptopropyltrimethoxysilane (A-189).

In a further technical solution, the coloring agent includes at least one of titanium pigment, pigment blue, pigment green, and carbon black.

In a further technical solution, the vulcanization accelerator includes at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

In a further technical solution, the binder includes at least one of a resorcinol donor and a methylene donor. The resorcinol donor can be selected from at least one of resorcinol (binder R), binder RS, binder RS-11, binder R-80, binder RL, binder PF, binder PE, binder RK, and binder RH; and the methylene donor can be selected from at least one of hexamethylenetetramine (HMTA), binder H-80, binder A, binder RA, binder AB-30, binder Rq, binder RC, binder CS963, and binder CS964.

In a further technical solution, the binder may also be selected from a triazine binder, and the specific commercial grade may be selected from at least one of binder TAR, binder TZ, binder AIR-1, and binder AIR-101, preferably at least one of binder AIR-1 and binder AIR-101; and the triazine binder can partially replace the resorcinol donor binder, and has the advantages of good adhesion and relatively environmental protection.

In an example of the present invention, in order to improve the adhesion of the rubber compound, the rubber composition may further comprise a tackifier. The pine tar, coumarone resin, RX-80, and liquid polyisobutene mentioned above for the plasticizer also have a tackifying effect. Liquid coumarone resin has a better tackifying effect than that of a solid coumarone resin. The tackifier can also be selected from the group consisting of C5 petroleum resin, C9 petroleum resin, hydrogenated rosin, terpene resin, alkyl phenolic resin, modified alkyl phenolic resin, alkylphenol-acetylene resin, and other commonly used tackifiers. The tackifier is usually used in an amount of not more than 30 parts by weight, further preferably not more than 10 parts by weight, and further preferably not more than 5 parts by weight, based on 100 parts by weight of the rubber matrix.

The crosslinking agent, the assistant crosslinking agent and the vulcanization accelerator involved in the rubber composition provided in the present invention all belong to a crosslinking system.

The rubber composition of the present invention may be present in the form of an uncrosslinked rubber mix, and may be present in the form of a vulcanized rubber after a further crosslinking reaction, and the vulcanized rubber may also be simply referred to as a vulcanizate.

The present invention also provides a method for processing the rubber composition, which comprises the following steps:

(1) rubber mixing, adding other components than the crosslinking system in the rubber composition sequentially to an internal mixer according to the parts by weight and carrying out mixing; then adding the crosslinking system, carrying out uniform mixing, and discharging to obtain a rubber mix; plasticating the rubber mix on an open mill, then unloading, and standing for vulcanization, wherein the crosslinking system includes a crosslinking agent, and also at least one of an assistant crosslinking agent and a vulcanization accelerator; and (2) vulcanization: filling a cavity of a mold with the rubber mix, carrying out vulcanizing on a press vulcanizer by pressing, and carrying out releasing from the mold to obtain a vulcanized rubber.

The present invention further provides rubber particles for a plastic track surface layer, and a rubber compound used comprises the above rubber composition.

The present invention further provides a method for producing the rubber particles for a plastic track surface layer, comprising the following steps:

(1) rubber mixing, adding other components than the crosslinking system in the rubber composition sequentially to an internal mixer according to the parts by weight and carrying out mixing; then adding the crosslinking system, carrying out uniform mixing, and discharging to obtain a rubber mix for later use; plasticating the rubber mix on an open mill, unloading the sheet, and standing for 20 hours; carrying out remixing, making triangular bags on the open mill, adjusting the roll distance, and unloading the sheet, wherein the crosslinking system includes a crosslinking agent, and also at least one of an assistant crosslinking agent and a vulcanization accelerator;

(2) extrusion and vulcanization: adopting a vacuum extruder in the extrusion vulcanization process, and after the extrusion, adopting a salt bath vulcanization process; and (3) carrying out cooling, drying, shearing, granulating, and packaging.

The present invention further provides a rubber compound of an insulating layer or a sheathing layer for a cable, and the rubber compound used comprises the above rubber composition.

The present invention further provides a method for producing the rubber compound of the insulating layer or sheathing layer for a cable, comprising the following steps:

(1) rubber mixing, adding other components than the crosslinking system in the rubber composition sequentially to an internal mixer according to the parts by weight and carrying out mixing; then adding the crosslinking system, carrying out uniform mixing, and discharging to obtain a rubber mix for later use; plasticating the rubber mix on an open mill, unloading the sheet, and standing for 20 hours; carrying out remixing, making triangular bags on the open mill, adjusting the roll distance, and unloading the sheet, wherein the crosslinking system includes a crosslinking agent, and also at least one of an assistant crosslinking agent and a vulcanization accelerator; and (2) granulation: comprising adding the rubber mix to an extruder, and carrying out extruding, shearing, granulating, and packaging.

The present invention further provides a high-temperature resistant conveyor belt, and at least one layer of a working surface covering rubber and a non-working surface covering rubber comprises the above rubber composition provided by the present invention.

The present invention further provides a method for producing the high-temperature resistant conveyor belt, wherein the working surface covering rubber comprises the above rubber composition, and the production method comprises the following steps:

(1) rubber mixing, adding other components than the crosslinking system in the rubber composition sequentially to an internal mixer according to the parts by weight and carrying out mixing; then adding the crosslinking system, carrying out uniform mixing, and discharging to obtain a rubber mix for later use, wherein the crosslinking system includes a crosslinking agent, and also at least one of an assistant crosslinking agent and a vulcanization accelerator;

(2) calendering process: placing the above rubber mix in a screw extruder for hot remixing, and then loading the rubber mix to a calender for carrying out calendering and discharging a sheet for later use;

(3) molding process: closely attaching the rubber sheet to a pre-molded rubberized canvas belt on a molding machine to form a belt blank of the high-temperature resistant conveyor belt, then rolling up the belt blank and vulcanizing the belt blank after standing;

(4) vulcanization process: placing the above molded conveyor belt blank in a press vulcanizer for carrying out segmental vulcanization; and (5) trimming and inspection: after vulcanization, carrying out trimming, inspecting, packaging, and warehousing.

The present invention further provides a waterproof coil, and a rubber compound used comprises the above rubber composition.

The present invention further provides a method for producing the waterproof coil, comprising the following steps:

(1) rubber mixing, adding other components than the crosslinking system in the rubber composition sequentially to an internal mixer according to the parts by weight and carrying out mixing; then adding the crosslinking system, carrying out uniform mixing, and discharging to obtain a rubber mix for later use; conveying the block rubber mix to an open mill for carrying out mixing to obtain a rubber sheet with a smooth, uniform and glossy surface, and cooling the rubber sheet to 50° C. or lower to be discharged and stacked, wherein the crosslinking system includes a crosslinking agent, and also at least one of an assistant crosslinking agent and a vulcanization accelerator;

(2) hot remixing: placing the uniformly mixed rubber sheet on the open mill and carrying out hot remixing, and preliminarily rolling the rubber sheet after the rubber sheet is smooth and uniform;

(3) calendering: placing the preliminarily rolled rubber sheet after hot remixing on a calender, adjusting the roller spacing according to the thickness requirement of a finished product, and carrying out calendering to obtain a semi-finished coil meeting the thickness specification requirements of the finished product;

(4) winding: according to the specification length requirement of the finished coil, sandwiching an isolation liner layer, and trimming the semi-finished coil into a roll;

(5) vulcanization: placing the coil in a vulcanization kettle for carrying out vulcanization treatment; and (6) rewinding: opening the vulcanized coil, taking out the isolation liner layer, and rewinding and packaging the coil into a product.

The present invention further provides a rubber plug, and a rubber compound used comprises the above rubber composition.

The present invention further provides a method for producing the rubber plug, comprising the following steps:

(1) rubber mixing, firstly adding other components than the crosslinking system in the rubber composition sequentially to an internal mixer according to the parts by weight and carrying out mixing; then adding the crosslinking system, and carrying out uniform mixing, and discharging; carrying out open milling and sheet pressing on the rubber mix on an open mill, and standing for later use, wherein the crosslinking system includes a crosslinking agent, and also at least one of an assistant crosslinking agent and a vulcanization accelerator;

(2) extrusion: comprising extruding the rubber mix into a strip by an extruding machine, and standing for later use;

(3) vulcanization: vulcanizing the extruded rubber mix by an injection molding vulcanizer; and (4) after-treatment: carrying out trimming, cleaning and silicification to obtain a finished product, and packaging and warehousing the finished product.

The present invention further provides a rubber roller, and a rubber compound used comprises the above rubber composition.

The present invention further provides a method for producing the rubber roller, comprising the following production steps:

(1) rubber mixing, setting the temperature and rotor speed of an internal mixer, adding other components than the crosslinking system in a rubber composition sequentially to the internal mixer and carrying out mixing; then adding the crosslinking system, carrying out mixing, and discharging, wherein the crosslinking system includes a crosslinking agent, and also at least one of an assistant crosslinking agent and a vulcanization accelerator; plasticating the rubber mix on an open mill, unloading the sheet, and carrying out standing and inspecting;

(2) winding and wrapping: putting the rubber mix into a screw extruder, extruding a rubber sheet with the thickness and width required by the process, starting a rotary winding machine after the rubber sheet is uniform, winding the rubber sheet on a prepared metal mandrel, winding and wrapping the rubber sheet layer by layer until the thickness of the rubberized single side reaches a predetermined thickness, and then winding 2-3 layers of nylon cure wrapping tape on the rubber surface to obtain a wrapped rubber roller;

(3) vulcanization in a vulcanizer: conveying the rubberized rubber roller into the vulcanizer for carrying out steam vulcanization, and pulling the rubber roller out after the vulcanization; and (4) after-treatment: rough-processing the vulcanized rubber roller on a lathe, then carrying out finishing on a grinding machine, and carrying out inspection to obtain a finished product.

The present invention further provides an inner tube, and a rubber compound for said inner tube comprises the above rubber composition.

The present invention further provides a method for producing an inner tube, comprising the following steps: firstly, mixing rubber, and carrying out filtering and standing; then extruding the rubber by an extruder, and cutting the rubber according to the length required by a process, sticking a valve, and carrying out splicing and standing; and then carrying out inflation setting, steam vulcanization, cooling, inspecting, and trimming to obtain the finished product.

The present invention further provides a tire, and at least one of a rubber compound of a tire sidewall and a rubber compound of a tire tread comprises the rubber composition.

In a further technical solution, a rubber composition for a tire tread or a tire sidewall has a branched polyethylene content of not less than 70 parts by weight based on 100 parts by weight of the rubber matrix.

The tire provided by the present invention is preferably used as a cycle tire, wherein the cycle tire can be a non-motorized tire such as a bicycle tire, a trolley tire, an animal power vehicle tire, and an electric vehicle tire, and in particular, it can be preferably used as a white or colored bicycle tire.

The rubber composition of the present invention can be used as a tire sidewall rubber, and a tire can be produced by a common method. That is, the rubber mix is subjected to extrusion processing in accordance with the sidewall shape of the tire design, and is molded together with other tire members by a common method on a tire molding machine to form an unvulcanized tire. The unvulcanized tire is heated and pressurized in a vulcanizer to obtain a tire.

The rubber composition of the present invention can be used as a tread rubber, and a tire can be produced by a common method. That is, the rubber mix is subjected to extrusion processing in accordance with the tread shape of the tire design, and is molded together with other tire members by a common method on a tire molding machine to form an unvulcanized tire. The unvulcanized tire is heated and pressurized in a vulcanizer to obtain a tire.

A steel wire or fiber skeleton used in the above tires is preferably of a surface treated type which can be well bonded to a non-polar rubber. Surface treatment can adopt a soaking RFL impregnation system.

The present invention further provides an air-conditioner rubber hose, comprising a barrier layer, an inner rubber layer, a knitted layer and an outer rubber layer sequentially from the inside to the outside, wherein a rubber compound for the inner rubber layer comprises the above rubber composition.

The present invention further provides a method for producing the air-conditioner rubber hose, comprising the following steps: extruding a nylon layer on a rubber hose mold mandrel, coating the mandrel with the nylon layer to form a barrier layer, then, extruding an inner rubber layer on the mandrel with the barrier layer, carrying out knitting on the outer surface of the inner rubber layer to obtain a knitted layer, then, extruding an outer rubber layer on the knitted layer to obtain a semi-finished air-conditioner rubber hose, vulcanizing the semi-finished rubber hose, and taking out the mandrel to obtain the finished rubber hose.

The present invention further provides a catheter, wherein a rubber compound used comprises the above rubber composition.

The catheter provided by the present invention is suitable for being used as a medical catheter or a food catheter.

The present invention also provides a method for producing the catheter, wherein the molding mode of the catheter is extrusion molding or pressure molding, and mold pressing vulcanization or high-temperature steam vulcanization is selected as a vulcanization mode of the catheter. The molding mode is preferably an extrusion molding mode. The high-temperature steam vulcanization process is suitable for a peroxide crosslinking system. The peroxide is preferably bis(2,4-dichlorobenzoyl) peroxide or 2,5-dimethyl-2,5-di (tert-butylperoxy)hexane. The further preferred form of the peroxide added is paste. If the amount of chemical additives needs to be reduced to make the product more suitable for the medical field or the food field, the vulcanization system in the rubber composition of the rubber hose can use a radiation crosslinking system, and a radiation crosslinking process is selected as the vulcanization mode. When a small amount of peroxide (such as DCP) is contained, the rate of radiation crosslinking can be significantly increased.

Compared with the prior art, the present invention has the beneficial effects that since the molecular structure of the branched polyethylene is completely saturated, the heat aging resistance is similar to that of EPM, and superior to that of EPDM, and the branched polyethylene can be vulcanized using a peroxide system. Moreover, since the molecular structure of the branched polyethylene has more branches, the length of the branch has a certain length distribution, and may have an appropriate number of secondary branched structures exist, the crosslinking point of the branched polyethylene could be generated on the tertiary carbon of the backbone or on the branched tertiary carbon of the secondary structure during the peroxide crosslinking. Therefore, the rubber network formed by the peroxide crosslinking of the branched polyethylene could have richer C-C bonding segments between the backbones than the ethylene-propylene rubber, which can effectively avoid the concentration of stress, and contribute to better mechanical properties. On the other hand, better crosslinking ability can effectively increase the crosslinking density, and the molecular weight distribution of the branched polyethylene is close to 2, which is narrower than that of the general ethylene-propylene rubber, so that it is also expected to obtain better compression set resistance.

DETAILED DESCRIPTION

The present invention is further described through examples, but such examples are not intended to limit the scope of the present invention. Some non-essential improvements and adjustments made by those skilled in the art to the present invention shall also fall within the protection scope of the present invention.

To more clearly illustrate the examples of the present invention, the materials involved in the present invention are defined below.

The silica adopted in the examples of the present invention is fumed silica or precipitated silica. For applications where transparency and electrical insulation are not critical, precipitated silica is preferred, and further, high-dispersibility precipitated silica is more preferred. Unless otherwise specified, the ordinary precipitated silica used in the examples is Solvay Rhodia zeosil 142, and the high-dispersibility silica grade is Solvay Rhodia zeosil 165N.

The crosslinking system includes a crosslinking agent, and may further include at least one of an assistant crosslinking agent and a vulcanization accelerator.

The EPM used preferably has a Mooney viscosity ML (1+4) at 125° C. of 20-45, further preferably 40-45, and preferably an ethylene content of 50%-60%.

The EPDM used preferably has a Mooney viscosity ML (1+4) at 125° C. of 20-100, further preferably 40-80, and preferably an ethylene content of 50%-75%. The third monomer is 5-ethylidene-2-norbornene, 5-vinyl-2-nor-bornene or dicyclopentadiene, and the content of the third monomer is 1%-7%.

The EPM and EPDM selected in the rubber matrix of the present invention preferably have a Mooney viscosity ML (1+4) 125° C. of 40-80, and an ethylene content of 45%-75%.

The branched polyethylene can be obtained by catalyzing homopolymerization of ethylene in the presence of an (α-diimine) nickel catalyst and a cocatalyst. The structure of the (α-diimine) nickel catalyst used, the synthesis method and the method for preparing branched polyethylene therewith are disclosed in the prior art, as described in, without limitation, CN102827312A, CN101812145A, CN101531725A, CN104926962A, U.S. Pat. No. 6,103,658, and U.S. Pat. No. 6,660,677.

The branched polyethylene used is characterized by having a degree of branching of 60-130 branches/1000 carbon atoms, a weight average molecular weight of 66,000-518,000, and a Mooney viscosity ML (1+4) at 125° C. of 6-102. The degree of branching is measured by $^1$H NMR, and the molar percentages of various branches are measured by $^{13}$C NMR.

The details are shown in a table below:

7. Test of optimum vulcanization time Tc90: The test is carried out at 160° C. in a rotorless vulcanizer in accordance with the national standard GB/T 16584-1996.

The vulcanization conditions in the following Examples 1-18 and Comparative Examples 1-3 include temperature: 160° C.; pressure: 16 MPa; and time Tc90+2 min.

The specific examples are shown below:

Example 1

Branched polyethylene No. PER-4 was used.

The processing steps were as follows.

(1) Rubber mixing: The temperature of the internal mixer was set to 90° C., and the rotor speed was set to 50 rpm. 70 parts of EPDM and 30 parts of branched polyethylene were added, prepressed and mixed for 90 seconds. 40 parts of silica was added, and the rubber compound was mixed for 3 min. Then 2 parts of the crosslinking agent dicumyl peroxide (DCP) was added, and the rubber compound was mixed for 2 min and then discharged. The rubber mix was plasticated on an open mill, the roller spacing was increased to obtain a sheet having a thickness of about 2.5 mm, and the sheet was unloaded and allowed to stand for 20 h. The sheet

| Branched polyethylene No. | Degree of branching | Methyl/% | Ethyl/% | Propyl/% | Butyl/% | Pentyl/% | Hexyl or higher/% | Weight average molecular weight/10,000 | Molecular weight distribution | Mooney viscosity ML(1 + 4) at 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 116 | 51.2 | 17.6 | 8.2 | 5.8 | 5.1 | 12.1 | 20.1 | 2.1 | 23 |
| PER-3 | 105 | 54.0 | 13.7 | 6.4 | 5.3 | 5.1 | 15.5 | 26.8 | 2.1 | 42 |
| PER-4 | 102 | 56.2 | 12.9 | 6.2 | 5.2 | 4.9 | 14.6 | 27.9 | 2.1 | 52 |
| PER-5 | 99 | 59.6 | 11.6 | 5.8 | 4.9 | 5.1 | 13.0 | 28.3 | 1.8 | 63 |
| PER-6 | 90 | 62.1 | 9.4 | 5.4 | 4.6 | 4.5 | 14.0 | 32.1 | 2.1 | 77 |
| PER-7 | 82 | 64.2 | 8.7 | 5.3 | 4.2 | 3.9 | 13.7 | 35.6 | 1.7 | 80 |
| PER-8 | 70 | 66.5 | 7.2 | 4.6 | 3.2 | 3.2 | 15.3 | 43.6 | 2.1 | 93 |
| PER-9 | 60 | 68.1 | 7.1 | 4.2 | 2.7 | 2.8 | 15.1 | 51.8 | 2.2 | 102 |
| PER-10 | 87 | 61.8 | 10.3 | 5.4 | 4.6 | 4.9 | 12.0 | 40.1 | 1.8 | 101 |
| PER-11 | 94 | 60.5 | 10.8 | 5.7 | 4.7 | 4.9 | 13.3 | 37.8 | 2.0 | 85 |
| PER-12 | 102 | 56.8 | 12.7 | 6.1 | 5.2 | 5.1 | 13.9 | 34.8 | 1.9 | 66 |

Rubber performance test methods:

1. Hardness test: The test is carried out using a hardness tester at room temperature in accordance with the national standard GB/T 531.1-2008.

2. Tensile strength and elongation at break performance test: The test is carried out with a type 2 dumbbell specimen using an electronic tensile tester at a tensile speed of 500 mm/min and a test temperature of 23±2° C. in accordance with the national standard GB/T 528-2009.

3. Tear performance test: The test is carried out with a right-angled specimen using an electronic tensile tester at a tensile speed of 500 mm/min and a test temperature of 23±2° C. in accordance with the national standard GB/T 529-2008.

4. Compression set test: The test is carried out with a B type specimen using a compression set device at an amount of compression of 25% and a test temperature of 70° C. in accordance with the national standard GB/T 7759-1996.

5. Mooney viscosity test: The test is carried out in accordance with the national standard GB/T 1232.1-2000, with a Mooney viscosity meter at a test temperature of 125° C. by preheating for 1 minute, and the test is continued for 4 minutes.

6. Hot air accelerated aging test: The test is carried out at 150° C. for 72 h in accordance with the national standard GB/T 3512-2001, in a heat aging test chamber.

was remixed and made into triangular bags on the open mill thrice, the roller spacing was adjusted to 2.5 mm, and the sheet was unloaded.

(2) After vulcanization, various tests were carried out after standing for 16 h.

Example 2

Branched polyethylene No. PER-4 was used.

The processing steps were as follows.

(1) Rubber mixing: The temperature of the internal mixer was set to 90° C., and the rotor speed was set to 50 rpm. 50 parts of EPDM and 50 parts of branched polyethylene were added, prepressed and mixed for 90 seconds. 40 parts of silica was added, and the rubber compound was mixed for 3 min. Then 2 parts of the crosslinking agent dicumyl peroxide (DCP) was added, and the rubber compound was mixed for 2 min and then discharged. The rubber mix was plasticated on an open mill, the roller spacing was increased to obtain a sheet having a thickness of about 2.5 mm, and the sheet was unloaded and allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 3

Branched polyethylene No. PER-4 was used.

The processing steps were as follows.

(1) Rubber mixing: The temperature of the internal mixer was set to 90° C., and the rotor speed was set to 50 rpm. 100 parts of branched polyethylene was added, prepressed and mixed for 90 seconds. 40 parts of silica was added, and the rubber compound was mixed for 3 min. Then 2 parts of the crosslinking agent dicumyl peroxide (DCP) was added, and the rubber compound was mixed for 2 min and then discharged. The rubber mix was plasticated on an open mill, the roller spacing was increased to obtain a sheet having a thickness of about 2.5 mm, and the sheet was unloaded and allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 4

Branched polyethylene No. PER-4 was used.

The processing steps were as follows.

(1) Rubber mixing: The temperature of the internal mixer was set to 90° C., and the rotor speed was set to 50 rpm. 100 parts of branched polyethylene was added, prepressed and mixed for 90 seconds. 40 parts of silica was added, and the rubber compound was mixed for 3 min. Then 2 parts of the crosslinking agent dicumyl peroxide (DCP) and 0.2 part of the assistant crosslinking agent sulfur were added, and the rubber compound was mixed for 2 min and then discharged. The rubber mix was plasticated on an open mill, the roller spacing was increased to obtain a sheet having a thickness of about 2.5 mm, and the sheet was unloaded and allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Comparative Example 1

The processing steps were as follows.

(1) Rubber mixing: The temperature of the internal mixer was set to 90° C., and the rotor speed was set to 50 rpm. 100 parts of EPDM was added, prepressed and mixed for 90 seconds. 40 parts of silica was added, and the rubber compound was mixed for 3 min. Then 2 parts of the crosslinking agent dicumyl peroxide (DCP) was added, and the rubber compound was mixed for 2 min and then discharged. The rubber mix was plasticated on an open mill, the roller spacing was increased to obtain a sheet having a thickness of about 2.5 mm, and the sheet was unloaded and allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 5

Branched polyethylene No. PER-5 was used.

The processing steps were as follows.

(1) Rubber mixing: The temperature of the internal mixer was set to 90° C., and the rotor speed was set to 50 rpm. 90 parts of EPDM and 10 parts of branched polyethylene were added, prepressed and mixed for 90 seconds. 40 parts of silica was added, and the rubber compound was mixed for 3 min. Then 3 parts of the crosslinking agent dicumyl peroxide (DCP) and 1 part of the assistant crosslinking agent triallyl isocyanurate (TAIC) were added, and the rubber compound was mixed for 2 min and then discharged. The rubber mix was plasticated on an open mill, the roller spacing was increased to obtain a sheet having a thickness of about 2.5 mm, and the sheet was unloaded and allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 6

Branched polyethylene No. PER-5 was used.

The processing steps were as follows.

(1) Rubber mixing: The temperature of the internal mixer was set to 90° C., and the rotor speed was set to 50 rpm. 20 parts of EPM, 50 parts of EPDM and 30 parts of branched polyethylene were added, prepressed and mixed for 90 seconds. 40 parts of silica was added, and the rubber compound was mixed for 3 min. Then 3 parts of the crosslinking agent dicumyl peroxide (DCP) and 1 part of the assistant crosslinking agent triallyl isocyanurate (TAIC) were added, and the rubber compound was mixed for 2 min and then discharged. The rubber mix was plasticated on an open mill, the roller spacing was increased to obtain a sheet having a thickness of about 2.5 mm, and the sheet was unloaded and allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 7

Branched polyethylene No. PER-5 was used.

The processing steps were as follows.

(1) Rubber mixing: The temperature of the internal mixer was set to 90° C., and the rotor speed was set to 50 rpm. 20 parts of EPDM and 80 parts of branched polyethylene were added, prepressed and mixed for 90 seconds. 40 parts of silica was added, and the rubber compound was mixed for 3 min. Then 3 parts of the crosslinking agent dicumyl peroxide (DCP) and 1 part of the assistant crosslinking agent triallyl isocyanurate (TAIC) were added, and the rubber compound was mixed for 2 min and then discharged. The rubber mix was plasticated on an open mill, the roller spacing was increased to obtain a sheet having a thickness of about 2.5 mm, and the sheet was unloaded and allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 8

Branched polyethylene No. PER-5 was used.

The processing steps were as follows.

(1) Rubber mixing: The temperature of the internal mixer was set to 90° C., and the rotor speed was set to 50 rpm. 100 parts of branched polyethylene was added, prepressed and mixed for 90 seconds. 40 parts of silica was added, and the rubber compound was mixed for 3 min. Then 3 parts of the crosslinking agent dicumyl peroxide (DCP) and 1 part of the assistant crosslinking agent triallyl isocyanurate (TAIC) were added, and the rubber compound was mixed for 2 min and then discharged. The rubber mix was plasticated on an open mill, the roller spacing was increased to obtain a sheet having a thickness of about 2.5 mm, and the sheet was unloaded and allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Comparative Example 2

The processing steps were as follows.

(1) Rubber mixing: The temperature of the internal mixer was set to 90° C., and the rotor speed was set to 50 rpm. 100 parts of EPDM was added, prepressed and mixed for 90 seconds. 40 parts of silica was added, and the rubber compound was mixed for 3 min. Then 3 parts of the crosslinking agent dicumyl peroxide (DCP) and 1 part of the assistant crosslinking agent triallyl isocyanurate (TAIC) were added, and the rubber compound was mixed for 2 min and then discharged. The rubber mix was plasticated on an open mill, the roller spacing was increased to obtain a sheet having a thickness of about 2.5 mm, and the sheet was unloaded and allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

| Test Item | Hardness | Tensile Strength/MPa | Elongation at break % | Tear strength/(N/mm) |
|---|---|---|---|---|
| Example 1 | 77 | 18.7 | 492 | 37.2 |
| Example 2 | 78 | 20.1 | 512 | 39.8 |
| Example 3 | 78 | 22.3 | 485 | 45.2 |
| Example 4 | 78 | 23.6 | 461 | 48.3 |
| Example 5 | 80 | 18.8 | 472 | 37.3 |
| Example 6 | 80 | 19.4 | 486 | 39.2 |
| Example 7 | 80 | 21.6 | 453 | 42.9 |
| Example 8 | 81 | 24.7 | 443 | 46.7 |
| Comparative Example 1 | 77 | 17.2 | 452 | 35.8 |
| Comparative Example 2 | 79 | 18.3 | 489 | 36.9 |

Performance test data analysis:

By comparison of the Examples 1-3 with the Comparative Example 1 and comparison of the Examples 5-8 with the Comparative Example 2, it can be found that as the proportion of the branched polyethylene replacing the ethylene-propylene rubber increased, the tensile strength and tear strength of the obtained vulcanized rubber were obviously enhanced, indicating that better mechanical properties can be obtained by using the rubber composition containing the branched polyethylene.

Example 9

Branched polyethylene No. PER-9 was used.

The processing steps were as follows.

(1) Rubber mixing: The temperature of the internal mixer was set to 100° C., and the rotor speed was set to 50 rpm.

90 parts of EPDM and 10 parts of branched polyethylene were added, and prepressed and mixed for 90 seconds. 5 parts of zinc oxide, 1 part of stearic acid, 3 parts of polyethylene glycol PEG4000, 2 parts of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 60 parts of silica, 20 parts of calcined clay and 20 parts of paraffin oil SUNPAR2280 were added to the rubber compound, and the rubber compound was mixed for 3 min. Finally, 4 parts of the crosslinking agent dicumyl peroxide (DCP) and 1 part of the assistant crosslinking agent triallyl isocyanurate (TAIC) were added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 10

Branched polyethylene No. PER-8 was used.

The processing steps were as follows.

(1) Rubber mixing: The temperature of the internal mixer was set to 100° C., and the rotor speed was set to 50 rpm. 80 parts of EPDM and 20 parts of branched polyethylene were added, prepressed and mixed for 90 seconds. 5 parts of zinc oxide, 1 part of stearic acid, 3 parts of polyethylene glycol PEG4000, 2 parts of vinyl tris(2-methoxyethoxy) silane (A-172) and 1 part of the anti-aging agent 2,2,4-trimethyl-1,2-dihydroquinoline polymer (RD) were added, and the rubber compound was mixed for 2 min. Then 60 parts of silica, 20 parts of calcined clay and 20 parts of paraffin oil SUNPAR2280 were added to the rubber compound, and the rubber compound was mixed for 3 min. Finally, 4 parts of the crosslinking agent dicumyl peroxide (DCP) and 1 part of the assistant crosslinking agent triallyl isocyanurate (TAIC) were added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 11

Branched polyethylene No. PER-7 was used.

The processing steps were as follows.

(1) Rubber mixing: The temperature of the internal mixer was set to 100° C., and the rotor speed was set to 50 rpm. 20 parts of EPM, 30 parts of EPDM and 50 parts of branched polyethylene were added, prepressed and mixed for 90 seconds. 5 parts of zinc oxide, 1 part of stearic acid, 3 parts of polyethylene glycol PEG4000, 2 parts of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 60 parts of silica, 20 parts of calcined clay and 20 parts of paraffin oil SUNPAR2280 were added to the rubber compound, and the rubber compound was mixed for 3 min. Finally, 3 parts of the crosslinking agent dicumyl peroxide (DCP), 1 part of the crosslinking agent sulfur, 1 part of N-cyclohexyl-2-benzothiazole sulfenamide (CZ) and 0.8 part of tetramethyl thiuram disulfide (TMTD) were added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 12

Branched polyethylene No. PER-7 was used.
The processing steps were as follows.
(1) Rubber mixing: The temperature of the internal mixer was set to 100° C., and the rotor speed was set to 50 rpm. 100 parts of branched polyethylene was added, prepressed and mixed for 90 seconds. 5 parts of zinc oxide, 1 part of stearic acid, 3 parts of polyethylene glycol PEG4000, 2 parts of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 60 parts of silica, 20 parts of calcined clay, 10 parts of titanium pigment and 20 parts of paraffin oil SUNPAR2280 were added to the rubber compound, and the rubber compound was mixed for 3 min. Finally, 4 parts of the crosslinking agent dicumyl peroxide (DCP), 1 part of the assistant crosslinking agent triallyl isocyanurate (TAIC) and 0.3 part of the assistant crosslinking agent sulfur were added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 13

Branched polyethylene Nos. PER-1 and PER-7 were used.
The processing steps were as follows.
(1) Rubber mixing: The temperature of the internal mixer was set to 100° C., and the rotor speed was set to 50 rpm. 70 parts of PER-7 and 30 parts of PER-1 were added, prepressed and mixed for 90 seconds. 10 parts of zinc oxide, 2 parts of stearic acid, 2 parts of polyethylene glycol PEG4000, 1 part of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 10 parts of titanium pigment, 15 parts of silica, 60 parts of calcined clay, 40 parts of aluminium silicate and 120 parts of paraffin oil SUNPAR2280 were added to the rubber compound, and the rubber compound was mixed for 3 min. Finally, 8 parts of the crosslinking agent dicumyl peroxide (DCP), 2 parts of the assistant crosslinking agent triallyl isocyanurate (TAIC) and 8 parts of 1,2-polybutadiene were added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 14

Branched polyethylene No. PER-4 was used.
The processing steps were as follows.
(1) Rubber mixing: The temperature of the internal mixer was set to 100° C., and the rotor speed was set to 50 rpm. 100 parts of branched polyethylene was added, prepressed and mixed for 90 seconds. 20 parts of zinc oxide, 2 parts of stearic acid, 5 parts of polyethylene glycol PEG4000, 2 parts of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 40 parts of silica, 80 parts of talcum powder and 20 parts of paraffin oil SUNPAR2280 were added to the rubber compound, and the rubber compound was mixed for 3 min. Finally, 5 parts of the crosslinking agent dicumyl peroxide (DCP) and 2 parts of the assistant crosslinking agent triallyl isocyanurate (TAIC) were added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 15

Branched polyethylene Nos. PER-3 and PER-6 were used.
The processing steps were as follows.
(1) Rubber mixing: The temperature of the internal mixer was set to 100° C., and the rotor speed was set to 50 rpm. 80 parts of PER-6 and 20 parts of PER-3 were added, prepressed and mixed for 90 seconds. 10 parts of zinc oxide, 2 parts of stearic acid, 10 parts of polyethylene glycol PEG4000, 3 parts of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 80 parts of silica, 50 parts of calcined clay and 50 parts of paraffin oil SUNPAR2280 were added to the rubber compound, and the rubber compound was mixed for 3 min. Finally, 10 parts of the crosslinking agent dicumyl peroxide (DCP), 2 parts of the assistant crosslinking agent triallyl isocyanurate (TAIC) and 8 parts of 1,2-polybutadiene were added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 16

Branched polyethylene No. PER-6 was used.
The processing steps were as follows.
(1) Rubber mixing: The temperature of the internal mixer was set to 100° C., and the rotor speed was set to 50 rpm.

100 parts of branched polyethylene was added, prepressed and mixed for 90 seconds. 10 parts of zinc oxide, 2 parts of stearic acid, 5 parts of polyethylene glycol PEG4000, 2 parts of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 5 parts of iron oxide red, 60 parts of silica, 70 parts of calcined clay, 50 parts of calcium carbonate and 55 parts of paraffin oil SUNPAR2280 were added to the rubber compound, and the rubber compound was mixed for 3 min. Finally, 6 parts of the crosslinking agent dicumyl peroxide (DCP), 2 parts of the assistant crosslinking agent N,N'-m-phenylene bismaleimide (HVA-2) and 0.3 part of sulfur were added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

Example 17

Branched polyethylene No. PER-5 was used.
The processing steps were as follows.
(1) Rubber mixing: The temperature of the internal mixer was set to 100° C., and the rotor speed was set to 50 rpm.

was remixed and made into triangular bags on the open mill thrice, the roller spacing was adjusted to 2.5 mm, and the sheet was unloaded.

(2) After vulcanization, various tests were carried out after standing for 16 h.

Example 18

Branched polyethylene No. PER-4 was used.
The processing steps were as follows.
(1) Rubber mixing: The temperature of the internal mixer was set to 100° C., and the rotor speed was set to 50 rpm. 100 parts of PER-4 was added, prepressed and mixed for 90 seconds. 5 parts of zinc oxide, 0.5 part of stearic acid, and 2 parts of vinyl tris(2-methoxyethoxy)silane (A-172) were added, and the rubber compound was mixed for 2 min. Then 4 parts of iron oxide red, 60 parts of silica, 50 parts of calcium carbonate and 30 parts of 300# paraffin oil were added to the rubber compound, and the rubber compound was mixed for 3 min. Finally, 4 parts of the crosslinking agent dicumyl peroxide (DCP) was added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) After vulcanization, various tests were carried out after standing for 16 h.

| Test Item | Hardness | Tensile Strength/MPa | Elongation at break % | Tear strength/(N/mm) | Compression set (70° C. × 22 h) | After Aging (150° C.× 70 h) | | |
|---|---|---|---|---|---|---|---|---|
| | | | | | | Hardness | Retention rate of tensile strength/% | Retention rate of elongation at break/% |
| Comparative Example 3 | 79 | 14.2 | 652 | 19.2 | 19 | 87 | 72 | 34 |
| Example 9 | 80 | 14.6 | 641 | 20.8 | 18 | 87 | 74 | 42 |
| Example 10 | 80 | 15.2 | 588 | 24.6 | 18 | 88 | 78 | 51 |
| Example 11 | 80 | 18.2 | 528 | 28.9 | 17 | 89 | 75 | 53 |
| Example 12 | 80 | 21.3 | 509 | 33.5 | 15 | 89 | 84 | 62 |
| Example 13 | 42 | 14.2 | 786 | 16.7 | 13 | 46 | 81 | 63 |
| Example 14 | 79 | 18.4 | 469 | 34.1 | 18 | 87 | 78 | 72 |
| Example 15 | 81 | 19.6 | 347 | 38.9 | 17 | 89 | 82 | 71 |
| Example 16 | 74 | 21.4 | 438 | 41.2 | 16 | 81 | 75 | 72 |
| Example 17 | 56 | 14.3 | 589 | 39.1 | 23 | 65 | 82 | 73 |
| Example 18 | 71 | 14.7 | 566 | 35.2 | 19 | 78 | 76 | 78 |

100 parts of PER-5 was added, prepressed and mixed for 90 seconds. 5 parts of zinc oxide, 1 part of stearic acid, 2 parts of polyethylene glycol PEG4000, 1 part of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 10 parts of titanium pigment, 40 parts of silica, 40 parts of calcined clay and 70 parts of paraffin oil SUNPAR2280 were added to the rubber compound, and the rubber compound was mixed for 3 min. Finally, 6 parts of the crosslinking agent dicumyl peroxide (DCP) and 2 parts of the assistant crosslinking agent triallyl isocyanurate (TRIC) were added, and the rubber compound was mixed for 2 min and then discharged. The rubber mix was plasticated on an open mill to obtain a sheet having a thickness of about 2.5 mm, and the sheet was allowed to stand for 20 h. The sheet Performance test data analysis:
By comparison of the Examples 9-12 with the Comparative Example 3, it can be found that as the proportion of the branched polyethylene replacing the ethylene-propylene rubber increased, the tensile strength and tear strength of the obtained vulcanized rubber were obviously enhanced, and the compression set decreased, indicating that the rubber composition containing branched polyethylene is also suitable for application occasions where small compression set is required, for example, rubber rollers, rubber plates, washing machine door seals, water seal rings for washing machine windows, and the like.

Example 19

A high-voltage insulating sheath rubber was obtained by using branched polyethylene No. PER-4.
The steps for obtaining the rubber mix are as follows:
(1) Rubber mixing: The temperature of the internal mixer was set to 100° C., and the rotor speed was set to 50 rpm.

100 parts of PER-4 was added, prepressed and mixed for 90 seconds. 5 parts of zinc oxide, 0.5 part of stearic acid, and 2 parts of vinyl tris(2-methoxyethoxy)silane (A-172) were added, and the rubber compound was mixed for 2 min. Then 4 parts of iron oxide red, 60 parts of silica, 50 parts of calcium carbonate and 30 parts of 300# paraffin oil were added to the rubber compound, and the rubber compound was mixed for 3 min. Finally, 4 parts of the crosslinking agent dicumyl peroxide (DCP) was added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) Granulation: The rubber mix was added to an extruder, and extruding, shearing, granulating, and packaging were carried out.

Vulcanization and performance test:

Vulcanization process: Steam vulcanization was carried out at 155° C. for 40 min, and immersion in water was carried out.

Performance test: The hardness was 71; the tensile strength was 14.7 MPa; the elongation at break was 566%; and the volume resistivity was $2.5\times10^{\wedge}15$; after hot air aging at 150° C. for 72 h: the hardness was 78; the tensile strength retention was 76%; and the elongation at break retention was 78%.

Example 20

A high-temperature resistant conveyor belt was obtained by the following production process steps:

The high-temperature resistant conveyor belt was provided with belt core tensile canvas between the working surface covering rubber and the non-working surface covering rubber, and they were made into a solid whole through molding and vulcanization processes.

The composition and proportion of the working surface covering rubber according to the examples of the present invention were calculated in parts.

(1) Rubber mixing process:

The temperature of the internal mixer was set to 100° C., and the rotor speed was set to 50 rpm. 100 parts of branched polyethylene PER-5 was added, prepressed and mixed for 90 seconds. 5 parts of zinc oxide, 1 part of stearic acid, 3 parts of polyethylene glycol PEG4000, 2 parts of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 10 parts of titanium pigment, 60 parts of silica, 20 parts of calcined clay and 20 parts of paraffin oil SUNPAR2280 were added to the rubber compound, and the rubber compound was mixed for 3 min. Finally, 4 parts of the crosslinking agent dicumyl peroxide (DCP), 1 part of the assistant crosslinking agent triallyl isocyanurate (TAIC) and 0.3 part of the assistant crosslinking agent sulfur were added, and the rubber compound was mixed for 2 min and then discharged.

(2) Calendering process:

The above rubber mix was placed in a screw extruder for hot remixing, and then the rubber mix was loaded to a calender for performing calendering and discharging a sheet for later use. The thickness of the calendered and discharged rubber sheet was controlled at 4.5-12 mm, and the discharged sheet was insulated for later use.

(3) Molding process:

The rubber sheet was closely attached to a pre-molded rubberized canvas belt on a molding machine to form a belt blank of the high-temperature resistant conveyor belt, and then the belt blank was rolled up for 4 h and vulcanized.

(4) Vulcanization process:

The molded conveyer belt blank was put in a press vulcanizer and subjected to segmental vulcanization, the vulcanization time per plate was 25 min, the vulcanization pressure was 2.5 MPa, and the vulcanization temperature was 160° C.

Example 21

A waterproof coil was obtained by the following production process steps: (1) Rubber mixing: The temperature of the internal mixer was set to 100° C., and the rotor speed was set to 50 rpm. 100 parts of branched polyethylene PER-6 was added, prepressed and mixed for 90 seconds. 10 parts of zinc oxide, 1 part of stearic acid, 3 parts of polyethylene glycol PEG4000, 2 parts of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 10 parts of titanium pigment, 60 parts of silica, 20 parts of calcined clay and 20 parts of paraffin oil SUNPAR2280 were added to the rubber compound, and the rubber compound was mixed for 3 min. Finally, 4 parts of the crosslinking agent dicumyl peroxide (DCP), 1 part of the assistant crosslinking agent triallyl isocyanurate (TAIC) and 0.3 part of the assistant crosslinking agent sulfur were added, and the rubber compound was mixed for 2 min and then discharged. The block rubber compound was conveyed into an open mill and mixed, the roller temperature was controlled at 85-95° C., the roller spacing was controlled to be less than 1 mm, and plasticating was carried out four times or more until the surface of the rubber compound was smooth, uniform and glossy. The rubber compound was further mixed, plasticating was carried out four times or more, the roller spacing was adjusted not to exceed 8 mm, the rubber compound was mixed thrice to obtain a uniformly mixed untrimmed rubber sheet having a thickness of 8 mm or less, and the untrimmed rubber sheet was cooled to 50° C. or lower, discharged, and stacked.

(2) Hot remixing: The uniformly mixed untrimmed rubber sheet was subjected to hot remixing on an open mill, the roller temperature was controlled at 85-95° C., the roller spacing was 6 mm or less, and the untrimmed rubber sheet was preliminarity rolled until the rubber sheet was smooth and uniform.

(3) Calendering: The preliminarily rolled rubber sheet after hot remixing was placed on a calender, the roller spacing is adjusted according to the thickness requirement of the finished product, and calendering is carried out to obtain a semi-finished coil meeting the thickness specification requirements of the finished product.

(4) Winding: According to the specification length requirement of the finished coil, an isolation liner layer was sandwiched, and the semi-finished coil was trimmed into a roll.

(5) Vulcanization: The trimmed coil was put in a vulcanization kettle and subjected to vulcanization treatment, the vulcanization kettle was controlled to have a temperature of 155-165° C. and a pressure of 20-50 MPa, and the vulcanization time was 25-30 min.

(6) Rewinding: The vulcanized coil was opened, the isolation liner layer was taken out, and the coil was rewound and packaged into a product.

Example 22

Red rubber particles for a plastic track surface layer were obtained by the following production process steps:

(1) Rubber mixing: The temperature of the internal mixer was set to 100° C., and the rotor speed was set to 50 rpm. 100 parts of branched polyethylene PER-8 was added, prepressed and mixed for 90 seconds. 10 parts of zinc oxide, 2 parts of stearic acid, 5 parts of polyethylene glycol PEG4000, 2 parts of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 5 parts of iron oxide red, 60 parts of silica, 70 parts of calcined clay, 50 parts of calcium carbonate and 55 parts of paraffin oil SUNPAR2280 were added to the rubber compound, and the rubber compound was mixed for 3 min. Finally, 6 parts of the crosslinking agent dicumyl peroxide (DCP), 2 parts of the assistant crosslinking agent N,N'-m-phenylene bismaleimide (HVA-2) and 0.3 part of sulfur were added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) Extrusion and vulcanization: A vacuum extruder was prefered in the extrusion vulcanization process, the temperature of the extruder was set to 100° C. at the head and 75° C. at the screw, the head pressure was controlled at 23 MPa, and the rotation speed of the extruder was 25 rpm. A salt bath vulcanization process was adopted, the temperature of a spraying section was 240° C., the temperature of a steeping section was 220° C., the temperature of a steeping press section was 220° C., the transmission speed was 40 m/min, and the temperature of a cooling section was 25° C.

(3) Drying, shearing, granulating, and packaging were carried out.

Example 23

A rubber plug was obtained by a mold pressing vulcanization production process comprising the following steps:

(1) Rubber mixing: The temperature of the internal mixer was set to 80° C., and the rotor speed was set to 50 rpm. 100 parts of branched polyethylene PER-4 and 3 parts of zinc oxide were added, prepressed and mixed for 90 seconds. Then 50 parts of barium sulfate, 10 parts of titanium pigment, 35 parts of high-dispersibility silica and 2 parts of vaseline were added to the rubber compound, and the rubber compound was mixed for 3 min. Finally, 3 parts of the crosslinking agent bis(tert-butylperoxyisopropyl)benzene and 1 part of the auxiliry crosslinking agent TAIC were added, and the rubber compound was mixed for 2 min and then discharged. The rubber mix was subjected to open milling and unloading on an open mill with a roller temperature of 60° C., and the rubber mix was allowed to stand for 20 h. The rubber mix was subjected to open milling and sheet pressing on the open mill, and then the sheet was allowed to stand for later use.

(2) Calendering: The rubber mix was calendered and pre-molded on a calender, and cooled.

(3) Vulcanization: The calendered rubber mix was put into a mold and subjected to mold pressing vulcanization for 25 min at a temperature of 160° C. and a pressure of 15 MPa, and after the preset vulcanization time, demolding and cooling were carried out.

(4) After-treatment: Trimming, cleaning and silicification were carried out to obtain a finished product, and the finished product was packaged and warehoused.

Example 24

A rubber roller was obtained by the following production processing steps:

(1) Rubber mixing: The temperature of the internal mixer was set to 100° C., and the rotor speed was set to 50 rpm. 100 parts of branched polyethylene PER-4 was added, prepressed and mixed for 90 seconds. 20 parts of zinc oxide, 2 parts of stearic acid, 5 parts of polyethylene glycol PEG4000, 2 parts of vinyl tris(2-methoxyethoxy)silane (A-172) and 1 part of the anti-aging agent 2,2,4-trimethyl-1,2-dihydroquinoline polymer (RD) were added, and the rubber compound was mixed for 2 min. Then 40 parts of silica, 80 parts of talcum powder and 20 parts of paraffin oil SUNPAR2280 were added to the rubber compound, and the rubber compound was mixed for 3 min. Finally, 5 parts of the crosslinking agent dicumyl peroxide (DCP) and 2 parts of the assistant crosslinking agent triallyl isocyanurate (TAIC) were added, and the rubber compound was mixed for 2 min and then discharged. The rubber mix was plasticated on an open mill to obtain a sheet having a thickness of about 2.5 mm, and the sheet was allowed to stand for 20 h. The sheet was remixed and made into triangular bags on the open mill thrice, the roller spacing was adjusted to 2.5 mm, and the sheet was unloaded.

(2) Winding and wrapping: The rubber mix was put into a screw extruder, a rubber sheet with the thickness and width required by the process was extruded, a rotary winding machine was started after the rubber sheet is uniform, the rubber sheet was wound on a prepared metal mandrel, winding and wrapping the rubber sheet layer by layer until the thickness of the rubberized single side reached a predetermined thickness, and then 2-3 layers of nylon cure wrapping tape was wound on the rubber surface to obtain a wrapped rubber roller.

(3) Vulcanization in a vulcanizer: The rubberized rubber roller was conveyed into the vulcanizer, and after a tank door was closed, steam was introduced into the vulcanizer for vulcanization. A compressed air valve was opened while the steam was introduced, and compressed air was introduced to increase the pressure in the vulcanizer to 4.5-5 atmospheric pressure in 0.5 h. The vulcanization procedure was that: firstly, the temperature was increased to 70-80° C. and maintained for 2 h; then, the temperature was increased to 100-110° C. and maintained for 0.5 h; then the temperature was increased to 120-130° C. and maintained for 0.5 h; and then the temperature was increased to 135-140° C. and maintained for 8-10 h. After vulcanization, an exhaust valve was opened, and the pressure dropped. When the pressure gauge pointer pointed to zero, the safety pin was opened. When steam floated out from the pin hole, the vulcanizer was half opened to lower the temperature. When the temperature in the tank was lower than 60° C. or equivalent to the room temperature, the rubber roller was pulled out.

(4) The vulcanized rubber roller was rough-processed on a lathe, then finished on a grinding machine, and inspected to obtain a finished product.

Example 25

An inner tube was obtained by the following production process steps:

(1) Rubber mixing: The temperature of the internal mixer was set to 100° C., and the rotor speed was set to 50 rpm. 100 parts of branched polyethylene PER-5 was added, prepressed and mixed for 90 seconds. Then, 5 parts of zinc oxide, 1 part of stearic acid, 5 parts of polyethylene glycol PEG4000, and 2 parts of vinyl tris(5-methoxyethoxy)silane (A-172) were added, and the rubber compound was mixed for 2 min. Then 40 parts of silica, 20 parts of calcined clay and 10 parts of paraffin oil SUNPAR2280 were added to the rubber compound, and the rubber compound was mixed for 3 min. Finally, 4 parts of the crosslinking agent dicumyl peroxide (DCP) and 2 parts of the assistant crosslinking agent N,N'-m-phenylene bismaleimide (HVA-2) were added, and the rubber compound was mixed for 2 min and then discharged. The rubber mix was subjected to open milling and plasticated on an open mill after filtration, and was allowed to stand for 20 h.

(2) Extrusion: The temperature of an extruder was set to 85° C., the bell mouth temperature was set to 115° C., and the speed of the conveyor belt was set to match with the extrusion speed. An inflating valve was mounted.

(3) Splicing: Splicing was carried out by a splicer, and then standing was carried out.

(4) Inflation setting and vulcanization: Inflation was carried out to 70% for the first time, and stopped for 15 seconds. Inflation was carried out to the set size for the second time. The vulcanization temperature was 180° C., the steam pressure was 0.9 MPa, the vulcanization time was 8 min. After vulcanization, the inner tube was taken out and cooled.

(5) Inspecting and trimming were carried out to obtain the finished inner tube.

Example 26

A tire sidewall rubber of a cycle tire was obtained by the following processing steps:

(1) Rubber mixing: The temperature of the internal mixer was set to 90° C., and the rotor speed was set to 50 rpm. 100 parts of branched polyethylene PER-5 was added, prepressed and mixed for 90 seconds. Then 5 parts of zinc oxide, 1 part of stearic acid, 2 parts of polyethylene glycol PEG4000, and 2 parts of vinyl tris(2-methoxyethoxy)silane (A-172) were added, and the rubber compound was mixed for 2 min. Then 30 parts of high-dispersibility silica, 30 parts of calcium carbonate, 5 parts of coumarone resin and 10 parts of paraffin oil SUNPAR2280 were added, and the rubber compound was mixed for 3 min. Then 4 parts of the crosslinking agent dicumyl peroxide (DCP), 1.5 parts of the assistant crosslinking agent N,N'-m-phenylene bismaleimide (HVA-2) and 0.3 part of the assistant crosslinking agent sulfur were added, and the rubber compound was mixed for 2 min and then discharged. The rubber mix was subjected to open milling on an open mill, and then unloaded, allowed to stand, and inspected.

(2) Extrusion molding: The rubber mix inspected qualified was subjected to extrusion molding by an extruder to obtain a rubber member of a tire sidewall shape for later use.

Example 27

The tread rubber of a cycle tire was obtained by the following processing steps:

(1) Rubber mixing: The temperature of the internal mixer was set to 90° C., and the rotor speed was set to 50 rpm. 80 parts of PER-7 and 20 parts of PER-1 were added, prepressed and mixed for 90 seconds. Then 10 parts of zinc oxide, 2 parts of stearic acid, 2 parts of polyethylene glycol PEG4000, and 1 part of the anti-aging agent 2,2,4-trimethyl-1,2-dihydroquinoline polymer (RD) were added, and the rubber compound was mixed for 2 min. Then 20 parts of high-dispersibility silica, 40 parts of light calcium carbonate, 5 parts of coumarone resin and 10 parts of paraffin oil SUNPAR2280 were added, and the rubber compound was mixed for 3 min. Then 4 parts of the crosslinking agent bis(tert-butyldioxyisopropyl)benzene (BIPB), 1.5 parts of the assistant crosslinking agent triallyl isocyanurate (TAIC) and 3 parts of zinc methacrylate were added, and the rubber compound was mixed for 2 min and then discharged. The rubber mix was subjected to open milling on an open mill, then unloaded, allowed to stand, and inspected.

(2) The rubber mix inspected qualified was calendered to an appropriate thickness and cut into strips for later use.

(3) Tread extrusion: A semi-finished tread was extruded by an extruder using a cold feed extrusion process.

Example 28

The tread rubber of a colored cycle tire was obtained by the following processing steps:

(1) Rubber mixing: The temperature of the internal mixer was set to 90° C., and the rotor speed was set to 50 rpm. 100 parts of PER-12 was added, prepressed and mixed for 90 seconds. Then 10 parts of zinc oxide, 2 parts of stearic acid, 2 parts of polyethylene glycol PEG4000, 2 parts of coumarone resin, 2 parts of Escorez-1102 tackifying resin and 1 part of the anti-aging agent RD were added, and the rubber compound was mixed for 2 min. Then 2 parts of yellow masterbatch, 20 parts of high-dispersibility silica, 40 parts of light calcium carbonate and 10 parts of paraffin oil SUNPAR2280 were added, and the rubber compound was mixed for 3 min. Then 4 parts of the crosslinking agent bis(tert-butyldioxyisopropyl)benzene (BIPB), 1.5 parts of the assistant crosslinking agent triallyl isocyanurate (TAIC) and 3 parts of zinc methacrylate were added, and the rubber compound was mixed for 2 min and then discharged. The rubber mix was subjected to open milling on an open mill, then unloaded, allowed to stand, and inspected.

(2) The rubber mix inspected qualified was calendered to an appropriate thickness and cut into strips for later use.

(3) Tread extrusion: A semi-finished tread was extruded by an extruder using a cold feed extrusion process.

Example 29

The tire sidewall rubber of a cycle tire was obtained by the following processing steps:

(1) Rubber mixing: The temperature of the internal mixer was set to 90° C., and the rotor speed was set to 50 rpm. 100 parts of branched polyethylene PER-12 was added, prepressed and mixed for 90 seconds. Then 5 parts of zinc oxide, 1 part of stearic acid, 2 parts of polyethylene glycol PEG4000, and 2 parts of vinyl tris(2-methoxyethoxy)silane (A-172) were added, and the rubber compound was mixed for 2 min. Then 30 parts of high dispersibility silica, 30 parts of calcium carbonate, 5 parts of coumarone resin and 10 parts of paraffin oil SUNPAR2280 were added, and the rubber compound was mixed for 3 min. Then 4 parts of the crosslinking agent dicumyl peroxide (DCP), 1.5 parts of the assistant crosslinking agent N,N'-m-phenylene bismaleimide (HVA-2) and 0.3 part of the assistant crosslinking agent sulfur were added, and the rubber compound was mixed for 2 min and then discharged. The rubber mix was subjected to open milling on an open mill, then unloaded, allowed to stand, and inspected.

(2) Extrusion molding: The rubber mix inspected qualified was subjected to extrusion molding by an extruder to obtain a rubber member of a tire sidewall shape for later use.

Example 30

An air-conditioner rubber hose was obtained by the following production process steps:

(1) Rubber mixing of inner rubber layer: Primary mixing: The temperature of the internal mixer was set to 80° C., and the rotor speed was set to 50 rpm. 100 parts of branched polyethylene PER-3 was added, prepressed and mixed for 90 seconds. 5 parts of zinc oxide, 1 part of stearic acid, 2 parts of polyethylene glycol PEG4000, and 2 parts of vinyl tris(2-methoxyethoxy)silane (A-172) were added, and the rubber compound was mixed for 2 min. Then 30 parts of silica, 3 parts of RS and 15 parts of liquid polyisobutylene were added to the rubber compound, and the rubber compound was mixed for 3 min and then discharged. Secondary mixing: The temperature of the internal mixer was set to 80° C., and the rotor speed was set to 50 rpm. The masterbatch was added to the internal mixer, 10 parts of AB-30 was added, and the rubber compound was mixed for 2 min. Finally, 4 parts of the crosslinking agent dicumyl peroxide (DCP) and 2 parts of the assistant crosslinking agent N,N'-m-phenylene bismaleimide (HVA-2) were added, and the rubber compound was mixed for 2 min and then discharged. The rubber mix was subjected to open milling on an open mill, then unloaded, and allowed to stand for later use.

(2) Extrusion and molding: A rubber hose mold mandrel was allowed to pass through a PPA (polyphthalamide) extruder, a PPA raw material was extruded on the mandrel, and the mandrel was coated with the PPA to form a barrier layer; an inner rubber layer was extruded, a fiber-reinforced layer was knitted, and an outer rubber layer was extruded.

(3) Vulcanization: A tape wrapping vulcanization process was used, during which the temperature was 165° C., the steam pressure was 1 MPa, and the vulcanization time was 25 min. Then tape unwrapping, mandrel stripping, and cutting were carried out to obtain the air-conditionaer rubber hose.

Example 31

A medical catheter was obtained by adopting an extrusion molding and high-temperature steam vulcanization production process, specifically comprising the following steps:

(1) Rubber mixing: The temperature of the internal mixer was set to 80° C., and the rotor speed was set to 50 rpm. 100 parts of branched polyethylene PER-12 was added, prepressed and mixed for 90 seconds. Then 30 parts of transparent silica (Suzhou Dongwu Chemical TS3), and 10 parts of colorless paraffin oil were added to the rubber compound, and the rubber compound was mixed for 3 min. Finally, 4 parts of the crosslinking agent 2,5-dimethyl-2,5-di(tert-butylperoxy)hexane (paste with an effective component content of 50%) and 1 part of the assistant crosslinking agent TAIC were added, and the rubber compound was mixed for 2 min and then discharged. The rubber mix was subjected to open milling and unloading on an open mill with a roller temperature of 60° C., and allowed to stand for 20 h for later use.

(2) Extrusion: The rubber mix was subjected to extrusion molding on an extruder, the rotation speed of the extruder was 50 r/min, and the head temperature was 90° C.

(3) Crosslinking: The extruded rubber mix was subjected to high-temperature steam vulcanization for 10 min at 170° C., and then, secondary vulcanization was carried out for 4 h at 160° C.

(4) After-treatment: Cleaning was carried out to obtain a finished product, and the finished product was packaged and warehoused.

Example 32

A white door and window sealing strip was obtained by the production process as follows:

(1) Rubber mixing: The temperature of the internal mixer was set to 80° C., and the rotor speed was set to 50 rpm. 100 parts of branched polyethylene PER-11 was added, prepressed and mixed for 90 seconds. 5 parts of zinc oxide, 1 part of stearic acid, 5 parts of calcium oxide, 2 parts of polyethylene glycol PEG4000, and 2 parts of vinyl tris(2-methoxyethoxy)silane (A-172) were added, and the rubber compound was mixed for 1 min. Then 50 parts of silica, 50 parts of calcium carbonate and 60 parts of paraffin oil SUNPAR2280 were added to the rubber compound, and the rubber compound was mixed for 3 min. Finally, 4 parts of the crosslinking agent bis(tert-butyldioxyisopropyl)benzene (BIPB), 1.5 parts of the assistant crosslinking agent triallyl isocyanurate (TAIC) and 0.3 part of sulfur were added, and the rubber compound was mixed for 2 min and then discharged. The rubber mix was automatically discharged to a double screw extruder and extruded into a sheet, the rubber mix was cooled on a rubber sheet cooling machine, and the rubber mix was automatically discharged to a pallet and packaged and molded after cooling to room temperature.

(2) Extrusion and vulcanization: A vacuum extruder was adopted in the extrusion vulcanization process, the temperature of the extruder was set to 90-100° C. at the head and 70-80° C. at the screw, the head pressure was controlled at 15-20 MPa, and the rotation speed of the extruder was 25-30 rpm. A salt bath vulcanization process was adopted, the temperature of a spraying section was 250° C., the temperature of a steeping section was 220° C., the temperature of a steeping press section was 220° C., the transmission speed was 35-45 m/min, and the temperature of a cooling section was 25-30° C.

(3) Cooling, trimming and cutting were carried out to obtain the finished product.

Example 33

Red rubber particles for a plastic track surface layer were obtained by using branched polyethylene PER-10, and the remaining composition formulations and processing techniques were consistent with Example 22.

What is claimed is:

1. A rubber composition, comprising a rubber matrix and essential components, wherein, the rubber matrix comprises, based on 100 parts by weight of the rubber matrix, a branched polyethylene with a content represented as A, in which 0<A<100, and an EPM and an EPDM, with a total content represented as B, in which 0<B<100;

wherein A+B is equal to 100 total parts;

wherein, based on 100 parts by weight of the rubber matrix, the essential components comprise 1-10 parts of a crosslinking agent and 15-80 parts of silica, wherein, the branched polyethylene comprises a combination of a first ethylene homopolymer and a second ethylene homopolymer, wherein each ethylene homopolymer has:

a degree of branching of not less than 50 branches/1000 carbon atoms, a weight average molecular weight of not less than 50,000, and a Mooney viscosity ML (1+4) at 125° C. of not less than 2.

2. The rubber composition according to claim 1, wherein, the crosslinking agent comprises at least one of a peroxide crosslinking agent and sulfur, and the peroxide crosslinking agent comprises at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di (tert-butylperoxy)hexane, 2,5-dimethyl-2,5-di (tert-butylperoxy)hexyne-3, bis (tert-butylperoxyisopropyl) benzene, 2,5-dimethyl-2,5-bis (benzoylperoxy)hexane, tert-butyl peroxybenzoate, and tert-butylperoxy-2-ethylhexyl carbonate.

3. The rubber composition according to claim 1, wherein, based on 100 parts by weight of the rubber matrix, the essential components comprise 2-7 parts of a crosslinking agent and 30-60 parts of silica.

4. The rubber composition according to claim 1, wherein, the silica is at least one of precipitated silica and fumed silica, and the precipitated silica is high-dispersibility precipitated silica.

5. The rubber composition according to claim 1, wherein, the rubber composition further comprises auxiliary components, and based on 100 parts by weight of the rubber matrix, the auxiliary components comprise: 0.2-10 parts of an assistant crosslinking agent, 20-120 parts of an inorganic filler, 2-130 parts of a plasticizer, 1-3 parts of the stabilizer, 2-20 parts of metal oxide, 1-20 parts of a surface modifier, 1-10 parts of a coloring agent, 0-3 parts of a vulcanization accelerator, and 0-20 parts of a binder.

6. The rubber composition according to claim 5, wherein the assistant crosslinking agent comprises at least one of triallyl cyanurate, triallyl isocyanurate, ethylene dimethacrylate, ethyl dimethacrylate, triethylene dimethacrylate, triallyl trimellitate, trimethylolpropane trimethacrylate, ethylene dimethyacrylate, N,N'-m-phenylene bismaleimide, N,N'-bis (furfurylidene)acetone, 1,2-polybutadiene, a metal salt of unsaturated carboxylic acid, and sulfur; the plasticizing agent comprises at least one of pine tar, engine oil, naphthenic oil, paraffin oil, coumarone, stearic acid, and paraffin; the metal oxide comprises at least one of zinc oxide, magnesium oxide, and calcium oxide; the inorganic filler comprises at least one of calcium carbonate, talcum powder, calcined clay, magnesium silicate, magnesium carbonate, and barium sulfate; the surface modifier comprises at least one of polyethylene glycol having a molecular weight of 2000 or 3400 or 4000, diphenyl silicon glycol, triethanolamine, vinyl tris(2-methoxyethoxy)silane, 3-glycidoxypropyltrimethoxysilane, and γ-mercaptopropyltrimethoxysilane; the coloring agent comprises at least one of iron oxide red, titanium pigment, pigment blue, pigment green, and carbon black; the vulcanization accelerator comprises at least one of 2-mercaptobenzothiazole, dibenzothiazyl disulfide, tetramethylthiuram monosulfide, tetramethylthiuram disulfide, tetraethylthiuram disulfide, N-cyclohexyl-2-benzothiazolesulfenamide, N,N-dicyclohexyl-2-benzothiazole-sulfenamide, bismaleimide, and ethylene thiourea; the binder comprises at least one of a resorcinol donor and a methylene donor.

7. A tire, wherein, the rubber compound used for the sidewall of said tire or the rubber compound used for the tread of said tire comprises the rubber composition according to claim 1.

8. The rubber composition according to claim 1, wherein:

the branched polyethylene content A is from 30 to 80 parts by weight;

the total content B of EPM and EPDM is from 20 to 70 parts by weight;

the crosslinking agent is present in an amount of 3-5 parts by weight based on 100 parts by weight of the rubber matrix; and the silica is present in an amount of 35-45 parts by weight based on 100 parts by weight of the rubber matrix.

9. The rubber composition according to claim 1, wherein the essential components include a stabilizer, and wherein the stabilizer comprises at least one of 2,2,4-trimethyl-1,2-dihydroquinoline polymer, and 6-ethoxy-2,2,4-trimethyl-1, 2-dihydroquinoline.

10. The rubber composition according to claim 1, wherein:

the branched polyethylene content A is from 50 to 70 parts by weight;

the total content B of EPM and EPDM is from 30 to 50 parts by weight;

the EPM is present in an amount of 10-30 parts by weight; and the EPDM is present in an amount of 20-40 parts by weight.

11. The rubber composition according to claim 1, wherein: the first ethylene homopolymer comprises 60-80% by weight of the total branched polyethylene; and the second ethylene homopolymer comprises 20-40% by weight of the total branched polyethylene.

12. The rubber composition according to claim 11, wherein: the first ethylene homopolymer comprises 70% by weight of the total branched polyethylene; the second ethylene homopolymer comprises 30% by weight of the total branched polyethylene.

13. The rubber composition according to claim 11, wherein:

both the first and second ethylene homopolymers have a secondary branch structure comprising branch-on-branch configuration formed by chain walking mechanism; and both the first and second ethylene homopolymers are produced by homopolymerization of ethylene in the presence of an (α-diimine) nickel catalyst.

14. A rubber product reinforced with silica, wherein, the rubber compound used for said rubber product reinforced with silica comprises said rubber composition according to claim 1.

15. The rubber product reinforced with silica according to claim 14, wherein, said rubber product reinforced with silica is used as rubber particles for a plastic track surface layer.

16. The rubber product reinforced with silica according to claim 14, wherein, said rubber product reinforced with silica is used as an insulating layer or sheathing layer for a cable.

17. The rubber product reinforced with silica according to claim 14, wherein, said rubber product reinforced with silica is a high-temperature resistant conveyor belt, which comprises a working surface covering rubber and a non-working surface covering rubber, wherein, the rubber compound used for at least one layer of said working surface covering rubber and said non-working surface covering rubber comprises said rubber composition.

18. The rubber product reinforced with silica according to claim 14, wherein, said rubber product reinforced with silica is a waterproof coil, a rubber plug, a rubber roller, an inner tube, or a catheter.

19. The rubber product reinforced with silica according to claim 14, wherein, said rubber product reinforced with silica is an air-conditioner rubber hose, which comprises a barrier layer, an inner rubber layer, a knitted layer and an outer rubber layer sequentially from the inside to the outside, wherein, the rubber compound used for the inner rubber layer comprises said rubber composition.

\* \* \* \* \*